Figure 1:
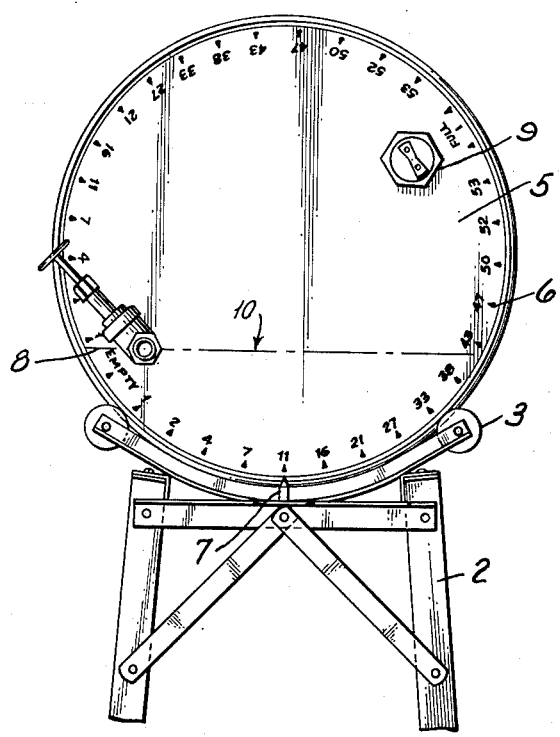

April 2, 1963 F. S. HIRSEKORN 3,083,873
LIQUID METERING APPARATUS
Filed July 29, 1960 2 Sheets-Sheet 1

INVENTOR.
Fred S. Hirsekorn
BY
Burns, Doane & Benedict
ATTORNEYS

April 2, 1963    F. S. HIRSEKORN    3,083,873
LIQUID METERING APPARATUS
Filed July 29, 1960    2 Sheets-Sheet 2
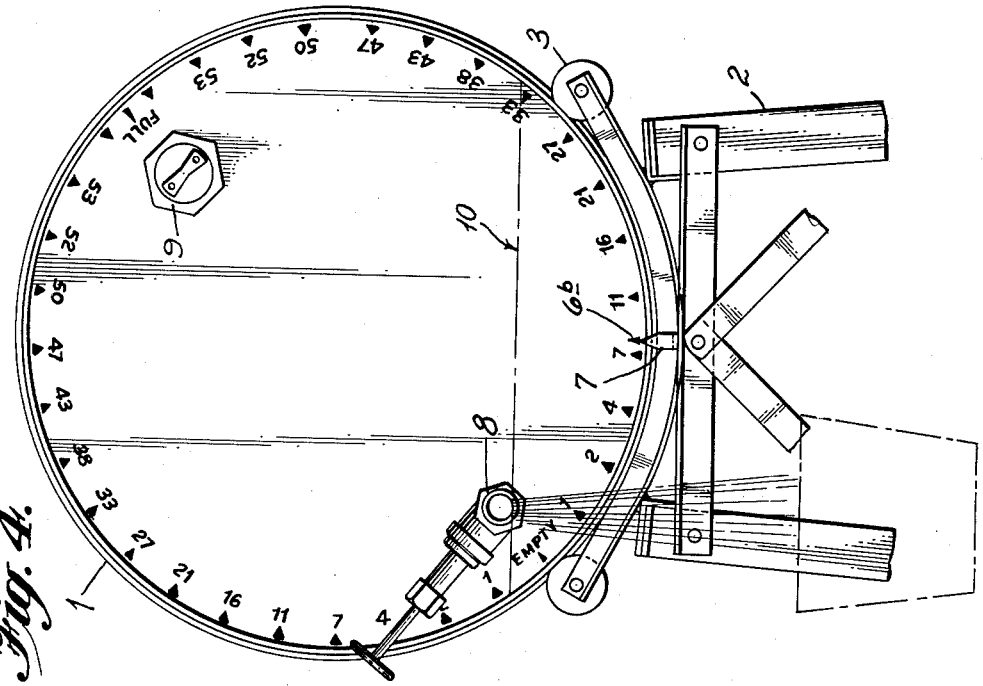
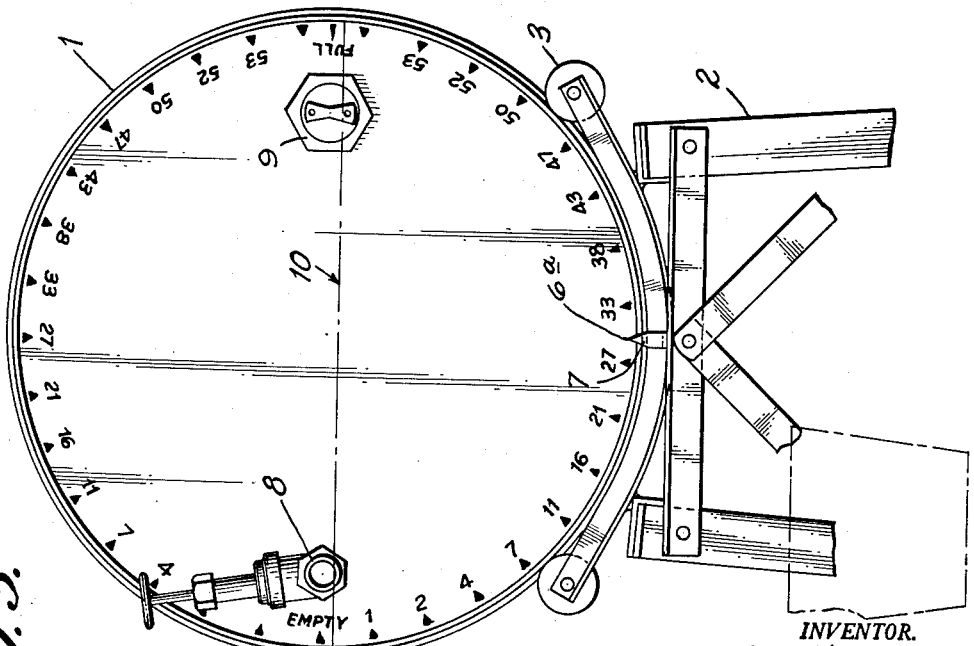
INVENTOR.
Fred S. Hirsekorn
BY
Burns, Doane & Benedict
ATTORNEYS United States Patent Office 3,083,873
Patented Apr. 2, 1963

3,083,873
LIQUID METERING APPARATUS
Fred S. Hirsekorn, Wichita, Kans., assignor to Frontier Chemical Company, Division of Vulcan Materials Company, Wichita, Kans., a corporation of New Jersey
Filed July 29, 1960, Ser. No. 46,138
2 Claims. (Cl. 222—48)

This invention relates to an apparatus for dispensing metered quantities of liquid and is characterized by a unique adaptability to employment in connection with conventional, large-capacity, industrial liquid receptacles.

It is known in the prior art to provide indicia on the outer surface of liquid receptacles such that a particular indicia, when aligned with the level of fluid within the receptacle or with a reference point, is indicative of the quantity of fluid remaining within the receptacle and not naturally drainable through a receptacle outlet. Such prior art devices, however, are intended primarily as a means for merely registering fluid remaining within or previously dispensed from a receptacle and are not conveniently adapted to accurate liquid metering.

It is an object of the present invention to provide a metering apparatus of maximum structural simplicity which may be handled with ease and convenience in dispensing predetermined and controlled quantities of liquid.

It is a further object of this invention to provide such a metering apparatus characterized by structural elements readily adaptable to existing large-capacity cylindrical liquid receptacles encountered in industry.

Of principal concern is the provision of a metering apparatus characterized by the advantages heretofore set forth and capable of effecting metered dispensing with a high degree of control and precision.

To accomplish the objects of this invention, there is contemplated an apparatus including a cylindrical receptacle on one end of which are positioned a plurality of coplanar indicia, radially and equidistantly spaced from the receptacle cylindrical axis. Stationary reference means which may be mounted on the support, are provided for referencing indicia corresponding to positions of receptacle rotation. To allow dispensing from the receptacle, there is included an outlet, which may be valved. This outlet extends through one wall of the receptacle, conventionally an end wall, and is radially spaced from the receptacle axis. To insure proper flow conditions, through the outlet, i.e., complete and quiescent drainage, at least one receptacle vent is utilized, which vent is radially spaced from the receptacle axis and spaced from the valved outlet, preferably diametrically opposite thereto. Mounting means are provided for supporting the receptacle for rotation about its horizontally disposed, longitudinal axis, which mounting means may include abutment means for insuring longitudinal alignment of the receptacle carried indicia with respect to the support carried reference means.

Each indicia, when aligned with the reference means, is a function of that portion of the receptacle capacity which is not naturally drainable through the receptacle outlet at the rotational position of the receptacle corresponding to the position of indicia and reference means alignment. Thus, by rotating the receptacle about its horizontally disposed axis to index it from a position of alignment of one indicia and the reference means, at which the level of fluid within the receptacle is level with the outlet, to a second position of alignment of the reference means and another indicia corresponding to a lesser fluid content, an amount of liquid equal to the difference between the quantities represented by the first and second indicia may be drained through the outlet.

Figure 2:
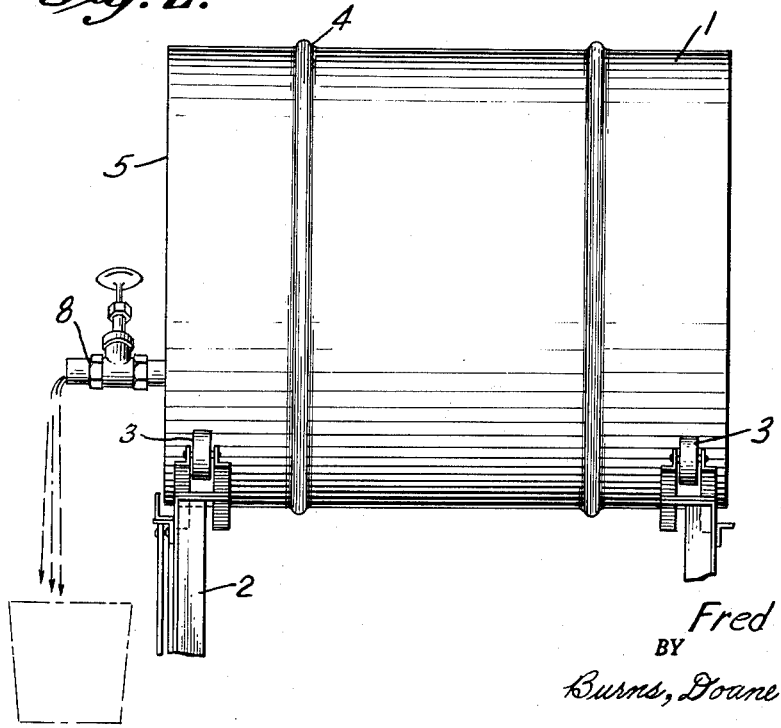

Having set forth the objects of this invention and described in general terms the structure involved, the mode of operation of the apparatus and a detailed description of a preferred embodiment will now be set forth by reference to the accompanying drawings, in which:

FIGURE 1 is a front elevation view of the apparatus.
FIGURE 2 is a side elevation view of the apparatus.
FIGURES 3 and 4 are front elevation views showing the apparatus employed in a liquid metering operation.

As illustrated in FIGURES 1 and 2, the apparatus of this invention includes a cylindrical receptacle 1, such as a conventional 55 gallon drum, rotatably mounted on an upstanding cradle support 2. Included in support 2, to facilitate precisely controlled manual rotation of receptacle 1, are a plurality of roller or bearing members 3. If desired, bearing members 3 may be arranged to function as abutment means relative to the conventional rolling rims 4 generally formed on large size liquid receptacles so as to longitudinally align drum 1 relative to support 2.

On an end face 5 of receptacle 1, there are provided a plurality of indicia 6. For referencing these indicia according to positions of rotation of receptacle 1 about its longitudinal axis, reference means, such as pointer 7, are provided on support 2.

Natural drainage flow from the receptacle 1 is effected through valved outlet 8, extending through an end wall of receptacle 1 and radially spaced from the receptacle longitudinal axis. To permit rapid, quiescent flow and complete natural drainage through outlet 8, vent 9 is provided. Vent 9, extending through an end wall of the receptacle and radially spaced from the receptacle axis, is positioned diametrically opposite to outlet 8. Such vent positioning permits an influx of air into the receptacle above the level of liquid contained therewithin to the maximum degree possible throughout the range of receptacle outlet positioning. Even though the vent be submerged, it would permit of venting frequently not possible through the lower positioned outlet.

Each indicia 6, when aligned with pointer 7, is a function of the receptacle liquid content in excess of that naturally and freely drainable through outlet 8 at the rotational position of receptacle 1 corresponding to this particular alignment. This function may involve a direct representation of undrained liquid or an indirect representation, such as a measure of total liquid drained from the full receptacle.

Through the readily controlled rotatability of receptacle 1, as provided through its cylindrical configuration and roller 3 supporting arrangement, precise indexing of the indicia to alignment with pointer 7 is permitted. Through the use of vent 9, in conjunction with valved outlet 8, rapid quiescent flow and complete natural drainage, through outlet 8, of liquid above the level of the outlet is effected by facilitating an influx of air into the space above the liquid level within the receptacle. These combined advantages of ease of indicia indexing and rapid, quiet and complete liquid drainability insure the adaptability of the apparatus to accurate metered dispensing operations. Thus, by indexing the receptacle from a position of first indicia and pointer 7 alignment, at which the level of liquid within the receptacle 1 is level with outlet 8, to a position of alignment of pointer 7 and another indicia representing a lesser liquid content, an amount of liquid equal to the difference between the quantities represented by the first and second indicia may be controllably and completely drained through outlet 8.

By reference to FIGURES 3 and 4, the use of the apparatus as a metering device may readily be appreciated. It may be assumed, for example, that the quantity of liquid within the receptacle is one-half its 55 gallon liquid content and that it is desired to drain from the receptacle a 20 gallon portion of its content. Having initially determined the half-filled level by rotating the receptacle until fluid flow commenced or ceased through outlet 8, depending on the direction of rotation, and noting, as shown in FIGURE 3, the alignment of the 27½ gallon indicia 6(a) with the pointer 7, it is merely necessary to further rotate the receptacle 1 to align the 7½ gallon indicia, designated 6(b) with pointer 7, thereby positioning vent 9 above the liquid level 10, and then allow drainage of the desired 20 gallons through outlet 8. Such metered drainage may be accomplished by draining through outlet 8 while indexing the receptacle or by maintaining valve outlet 8 closed during the indexing and opening it to allow complete drainage at the completion of indexing. Where the receptacle is less than half full, such that any indexing required for metered dispensing would result in vent 9 being rotated to a position above the receptacle liquid level, either drainage procedure may be utilized. Where, however, the receptacle liquid content is over half full, indexing prior to drainage may be desirable to position vent 9 above the liquid level of the receptacle to insure complete and quiescent drainage through outlet 8.

When metering is initiated in the over half capacity range, so long as the quantity of liquid to be metered is such as to result in the vent being positioned above the liquid level at the final indexed position, the vent would be positioned beneath the liquid level, if at all, during only a part of the dispensing operation. During the period of submersion, the vent should remain closed to avoid drainage through it; however, after the level has receded beneath the vent, the vent may be opened to insure complete drainage during the final phase of the metering. This vent opening and closing may be automatically effected through the use of conventional check-valved breather caps or vents commonly used with large capacity liquid receptacles.

Through the employment of a check-valved vent, optimum venting without liquid leakage could be accomplished throughout the entire range of receptacle liquid content. Depending, of course, upon the viscosity and specific gravity of the liquid contained within the receptacle, and the vacuum condition existing above the liquid level due to the recedence of the level during liquid drainage, the check-valved vent may permit venting even though the vent itself be submerged.

In the apparatus as illustrated, there is shown only a single vent. It is to be appreciated, however, that it is well within the scope of this invention to provide a plurality of spaced vents to obviate to a substantial degree the problems associated with a single vent structure.

In addition to being utilized as a metering apparatus for dispensing predetermined quantities of liquid, the apparatus may be effectively employed as a measuring device throughout the entire range of receptacle liquid content. For conventional dispensing, the receptacle may be rotated to bring outlet 8 to the centermost position at the bottom of the receptacle thereby positioning vent 9 at the top of the receptacle and above the normal maximum filling level. With the receptacle so disposed, and the vent opened, quiescent drainage may be effected through valved outlet 8. When it is desired to determine the amount of liquid remaining in the receptacle after a portion has been dispensed, it is merely necessary to rotate the receptacle to the point where the liquid level therewithin becomes even with the outlet. This point may readily be determined by rotating the receptacle to the point at which liquid ceases to flow from outlet 8 as the outlet is rotated from beneath the liquid level. Were it not for vent 9, it will be appreciated that not only would complete drainage through outlet 8 be hindered by the creation of a partial vacuum within the receptacle above the receding liquid, but that rough and irregular flow would result, tending to pose significant safety problems in handling dangerous industrial liquids.

In employing a fixed reference means such as pointer 7, it will readily be appreciated that the indicia referencing of the character heretofore described requires that the indicia be radially and equidistantly spaced from the receptacle cylinder axis to insure constant alignment of indicia and pointer 7 during rotation of the indicia carrying receptacle relative to the pointer carrying support. The spacing pattern between indicia, however, may vary. Where equal indicia spacing is desired, the increment between indicia, representing the difference in liquid content between adjacent indicia, varies along the indicia scale in a non-linear manner corresponding to the well recognized mathematical relationship existing between receptacle rotation and its non-drainable liquid content. Alternatively, where equal increments are desired, the spacing between indicia must be arranged so as to vary in a non-linear manner corresponding to the same mathematical relationship.

It is apparent that in the apparatus described, indicia are required over only one-half of a receptacle end face. However, as such an arrangement requires indexing for metering in one direction, and dual direction indexing may be desired, duplicate indicia may be provided on opposite end face halves, such as illustrated. The indicia may be arranged such that those on opposite sides are mirror images of each other so as to avoid confusion in dispensing operations. Under certain conditions, however, where metering for diverse purposes is required, it may be desired to employ diverse systems of indexing on each end face half.

The apparatus described has been shown to be characterized by structural simplicity, adaptability to conventional industrial liquid receptacles, and ease and accuracy in operation. The invention enables modification of existing liquid drums such that users may employ them for precise, rapid measuring or metering purposes without the necessity of auxiliary measuring devices. This not only is a significant economic factor but also eliminates the likelihood of damage to receptacle linings which frequently results from the use of metering or measuring devices required to be inserted into a receptacle. It will also be appreciated that by avoiding the insertion of foreign articles into the receptacle, contamination of liquid receptacle content is avoided.

While the invention has been described to a specific preferred embodiment, it will be understood that the invention is not limited to the details shown and described but is determined by the scope of the appended claims.

I claim:
1. An apparatus for dispensing metered quantities of liquid comprising:
   a cylindrical receptacle having a capacity of appoximately 55 gallons,
   means for supporting said receptacle for rotation about its horizontally disposed longitudinal axis.
   a plurality of coplanar indicia radially and equidistantly spaced from said longitudinal axis on one end wall of said receptacle,
   stationary reference means, carried by the means for supporting the receptacle, for referencing indicia corresponding to positions of receptacle rotation about its longitudinal axis,
   a valved liquid outlet extending through one end wall of said receptacle and radially spaced from said axis,
   a vent extending through one end wall of said receptacle and being radially spaced from said axis diametrically opposite to said valved outlet,
   each said indicia, when aligned with said reference means being a function of that portion of the capacity of the receptacle which cannot be drained through said outlet at the rotational position of said receptacle corresponding to said indicia and reference means alignment whereby, by rotating said receptacle about said axis to index the receptacle from a position of a first indicia and reference means alignment at which the level of liquid within the receptacle is level with said outlet, to a position of alignment of said reference means and a second indicia representing a lesser liquid content and at which said outlet is below said liquid level, an amount of liquid equal to the difference between the quantities represented by said first and second indicia may be freely drained through said outlet, said vent permitting complete and quiescent drainage of said amount.

2. An apparatus for dispensing metered quantities of liquid, comprising:

a cylindrical, large capacity, fluid receptacle, means for supporting said receptacle for rotation about the horizontally disposed, longitudinal axis, a plurality of coplanar indicia radially spaced from said receptacle longitudinal axis on one end wall of said receptacle, stationary reference means, carried by the means for supporting the receptacle, for referencing indicia corresponding to positions of receptacle rotation about its longitudinal axis, a liquid outlet extending through one wall of said receptacle and radially spaced from said axis, a vent extending through one wall of said receptacle and being radially spaced from said axis and spaced from said outlet, each said indicia, at a predetermined position of alignment being a function of that portion of the capacity of the receptacle which cannot be drained through said outlet at the rotational position of said receptacle corresponding to said indicia alignment whereby, by rotating said receptacle about its horizontally disposed, longitudinal axis, to index the receptacle from a position of alignment of said reference means and a first indicia at which the level of liquid within the receptacle is level with said outlet, to a position of alignment of said reference means and a second indicia representing a lesser liquid content and at which said outlet is below said liquid level, an amount of liquid equal to the difference between the quantities represented by said first and second indicia may be freely drained through said outlet, said vent permitting complete and quiescent drainage of said amount.

References Cited in the file of this patent

UNITED STATES PATENTS

| | | |
|---|---|---|
| 580,437 | Wagner | Apr. 13, 1897 |
| 1,024,415 | Mosby | Apr. 23, 1912 |

FOREIGN PATENTS

| | | |
|---|---|---|
| 279,615 | Germany | Oct. 23, 1914 |
| 879,319 | Germany | June 11, 1953 |
| 1,137,186 | France | Jan. 7, 1957 |